United States Patent [19]

Suzuki

[11] Patent Number: 4,792,826

[45] Date of Patent: Dec. 20, 1988

[54] OPTICAL DEVICE FOR COPYING MACHINE WITH INVERSION OF PRINCIPAL POINT OF OPTICAL SYSTEM

[75] Inventor: Takashi Suzuki, Omiya, Japan

[73] Assignee: Fuji Photo Optical Co., Ltd., Omiya, Japan

[21] Appl. No.: 89,423

[22] Filed: Aug. 26, 1987

[30] Foreign Application Priority Data

Sep. 27, 1986 [JP] Japan ................................ 61-227174

[51] Int. Cl.[4] ........................ G03G 15/04; G03B 27/34

[52] U.S. Cl. ............................................ 355/8; 355/57

[58] Field of Search ................................ 355/8, 55-58

[56] References Cited

U.S. PATENT DOCUMENTS 4,474,462 10/1984 Ogawa et al. ..................... 355/57 X

FOREIGN PATENT DOCUMENTS 59-28140 2/1984 Japan ..................................... 355/56

*Primary Examiner*—Arthur T. Grimley
*Assistant Examiner*—J. Pendegrass
*Attorney, Agent, or Firm*—Oblon, Fisher, Spivak, McClelland & Maier

[57] ABSTRACT

In a mirror scan type copying machine in which a light source and part of mirrors are movable, the optical system employs an asymmetrical lens construction for image formation. The optical system is mounted on an inverting drive mechansim for switching the optical system from a position where its principal point is located on the side of the original mount into a position where its principal point is located on the side of the sensitive material surface or vice versa.

5 Claims, 5 Drawing Sheets

OPTICAL DEVICE FOR COPYING MACHINE WITH INVERSION OF PRINCIPAL POINT OF OPTICAL SYSTEM

BACKGROUND OF THE INVENTION

1. Field of the Invention

This invention relates to an optical device for electrostatic copying machines with a copy enlarging and reducing function, and more particularly to an optical device for a copying machine in which the position of the principal point of the optical system can be inverted for copy enlargements and reductions.

2. Description of the Prior Art

Recently, electrostatic copying machines with the functions of enlarging and reducing the copy ratio form a main stream in the art. In a copying machine with such copy enlarging and reducing functions, the optical system which is interposed between an original mount and a sensitive material surface for exposure, e.g. a photosensitive drum surface, usually employs a symmetrical lens construction which has an principal point internally of the optical system like the so-called Orthometa- or Sellar-type lens. The optical system which is movable along the light path is located at a median position between the original mount and the sensitive material surface at the time of duplication in 1:1 copy ratio, shifting the optical system toward the original mount and the sensitive material surface at the time of copy enlargements and reductions, respectively, thereby varying the ratio of the light path length on the side of the object point or between the optical system and the original mount to the light path length on the side of the image point or between the optical system and the sensitive material surface according to changes in copy ratio.

In order to make the copying machine compact, more than one mirror is provided in each of the light paths on the sides of the object and image points, thereby folding the light paths in such a manner as to reduce the space for the entire light path length. In case of a copying machine of the type which has a fixed original mount and a movable light source for illuminating the original, some of the mirrors are moved to follow the movement of the light source.

Therefore, when shifting the positions of the optical system and mirrors to alter the copy ratio as mentioned hereinbefore, it is necessary to make arrangements to avoid interferences therebetween. That is to say, restrictions based on a selected range of copy ratios are imposed on the positional relationship between the optical system and the mirrors which are located forward and backward of the optical system. In this connection, although currently there is an extremely strong demand for small-sized and compact copying machines, the reduction of the machine size has a limit in view of the restrictions on the positional relationship of the optical system with the forward and backward located mirrors, which has a great influence on the dimensions of the copying machine. Otherwise, there is another problem that the designed range of the copy ratios has to be sacrificed to some extent for reduction of the machine size.

SUMMARY OF THE INVENTION

With the foregoing situations in view, the present invention has as its object the provision of an optical device for copying machines, in which the distances to mirrors located forward and backward of an optical system intended for a given range of copy ratios can be shortened in an interference-free state.

It is another object of the present invention to provide an optical device for copying machines, which permits to construct a copying machine with a given range of copy ratios in a compact form.

It is still another object of the invention to provide an optical device for copying machines, which can broaden the range of copy ratios to a maximum degree in a copying machine of given dimensions and shape.

In accordance with the present invention, the above-mentioned objects are achieved by the provision of an optical device which essentially includes: a movable light source for illuminating a document on an original mount; a plural number of mirrors for leading reflected light from the document to a predetermined light path, part of the mirrors being movable along the light path; an optical system located in a midway position in the light path and having an asymmetrical lens construction; a sensitive material surface for forming an image of the document thereon for exposure through the optical system; and an inverting drive mechanism for reversibly driving the optical system from a first position having the principal point thereof located along the light path on the side of the original mount into a second position having the principal point along the light path on the side of the sensitive material.

The above and other objects, features and advantages of the invention will become apparent from the following description and the appended claims, taken in conjunction with the accompanying drawings which show by way of example some preferred embodiments of the invention.

DESCRIPTION OF PREFERRED EMBODIMENTS

Figure 1:
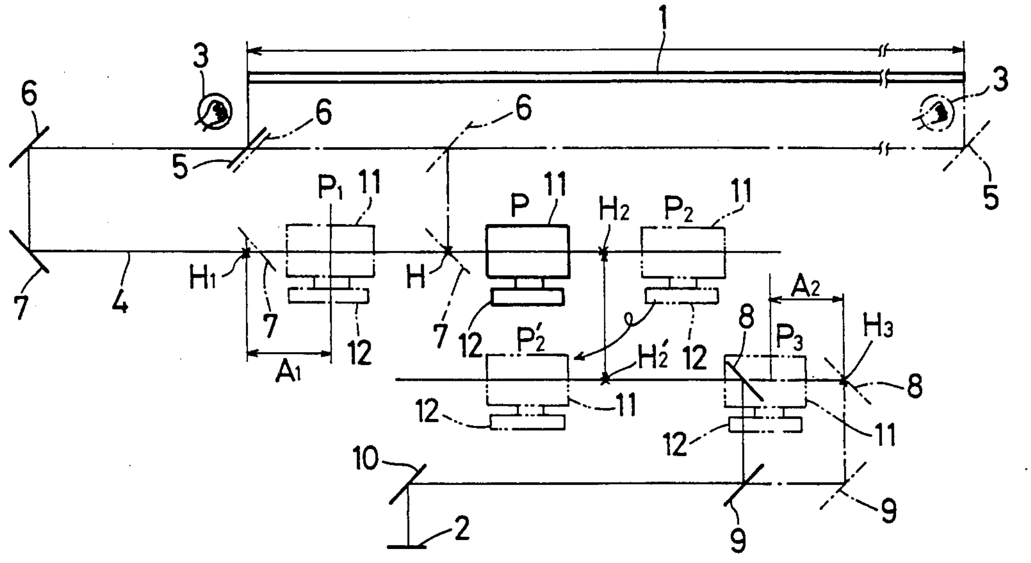
FIG. 1 is a diagrammatic illustration of the general construction of the optical device for copying machines of the present invention.
Figure 2:
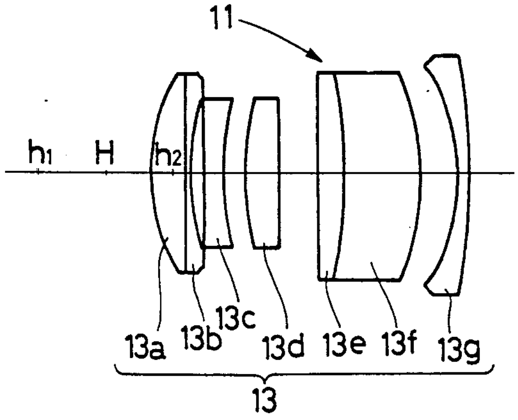
FIG. 2 is a side elevational view of an embodiment of a copying lens of the present invention.

Referring to FIG. 1, there are shown at 1 an original mount, at 2 a surface of a sensitive material like a drum, and at 3 a light source. A document on the original mount 1 is illuminated by light from the light source 3. Located midway of the path 4 of the reflected light are mirrors 5 to 10 by which the direction of the light path 4 is switched at right angles in a folding manner. An optical system 11 is interposed between the mirrors 7 and 8, the optical system 11 employing, as shown in FIG. 2, an asymmetrical lens construction combining a plural number of lenses 13 with a convex lens 13*a* at one end and a concave lens 13*g* at the other end. Accordingly, the principal point H (strictly the median point between a fore principal point h1 and a rear principal point h2) is located at a position outside of the optical lens 13. Although the optical system 11 employs a lens construction of fixed focal length, needless to say it may employ a zoom lens construction if necessary.

The copying machine shown is of the so-called mirror scan type in which the original mount 1 is fixed while the light source 3 and mirrors are movable, and which is capable of copy reductions and enlargements. For these purposes, the mirrors 5 to 7 of the afore-mentioned mirrors 5 to 10 consist of scan mirrors which are mounted on reciprocal drive mechanisms (not shown) for moving them together with the light source 3 between the original positions indicated by solid line in FIG. 1 and the scan end positions indicated by one-dot chain line, thereby to scan over the entire length of the document on the original mount 1. The optical system 11 is also movable along the light path 4 to permit copy reductions and enlargements in addition to natural or even ratio duplications. In order to correct the conjugate lengths in the copy reductions and enlargements, the mirrors 8 and 9 are movable from zero-positions indicated by solid line in the same figure to conjugate length correcting positions indicated by one-dot chain line. On the other hand, the mirror 10 alone is a fixed mirror.

Further, the above-described optical system 11 has an inverting construction, for switching the optical system between a telephoto position having the convex lens faced toward the original and its principal point H located on the side of the mirror 7 and a retrofocus position having the concave lens faced toward the original and its principal point H located on the side of the mirror 8.

In order to move the optical system 11 along the light path 4 according to changes in the copy ratio and to invert its principal point H as described above, it is mounted on a drive mechanism 12 which is, as shown in FIGS. 3 through 6, provided with a lens carriage 15 mounting thereon a lens barrel 14 for supporting lenses 13 of the optical system 11. The output shaft 16*a* of a pulse motor 16 which is mounted on the lens carriage 15 is extended through the latter and has a pinion 17 attached to its distal end. On the other hand, a carriage moving rack 19 with the pinion 17 is fixedly mounted on a frame 18 in a direction parallel with the optical axis. A guide rod 20 is also mounted on the frame 18 for guiding the lens carriage 15. Accordingly, on rotationally driving the pulse motor 16, the pinion 17 with the carriage moving rack 19 is rotated, moving the lens carriage 15 on the frame 18 under the guidance of the guide rod 20 and as a result reciprocably moving the lens barrel 14 in the direction of the optical axis. The reference numeral 21 denotes a roller which runs on the frame 18 during movement of the lens carriage 15.

The afore-mentioned lens barrel 14 is turnable to switch the directions of the front and rear end faces of the lens 13 through 180 degrees. The inverting mechanism for this is constituted in the manner as shown in FIGS. 4 and 5. More specifically, the lens barrel 14 is rotatably supported on the lens carriage 15 by a rotational shaft 22 which is provided with pinion a gear 23. The just-mentioned gear 23 is meshed with a lens turning rack 24 which is provided parallel with the carriage moving rack 19 and which is reciprocably movable along a guide rail 25 on the lens carriage 15. Stoppers 26*a* and 26*b* are fixed substantially at the opposite ends of the carriage transfer stroke, one of the stoppers 26*a* and 26*b* coming into contact with the lens turning rack 24 before the carriage 15 reaches its transfer stroke end when moved in the direction of arrow A or B in FIG. 3. As the carriage 15 is further moved to the stroke end in this state, the gear 23 which is meshed with the lens turning rack 24 is rotated to turn the lens barrel 14 through 180 degrees.

The lens barrel 14 which is inverted in the above-described manner should be fixable without deviations in the two positions before and after the inversion. For this purpose, as shown particularly in FIGS. 6(*a*) and 6(*b*), a positioning plate 27 is attached to the rotational shaft 22 for rotation integrally therewith. The positioning plate 27 is attached such that it has arms of different dimensions d and d' in length on opposite sides of the rotational shaft 22. On the other hand, stopper pins 28*a* and 28*b* are provided on the bottom side of the lens carriage 15 for holding the positioning plate 27 in the predetermined positions before and after the inversion. More particularly, when the positioning plate 27 is turned by the rotational shaft 22, one or the opposite side edge of the fore end portion of the longer arm of the positioning plate 27 comes selectively into contact with the stopper pin 28*a* or 28*b*. At this time, the positioning plate 27 is pressed against the stopper pin 28*a* or 28*b* by the action of a toggle spring 29 which is tensioned between the lens carriage 15 and the positioning plate 27. Therefore, the lens barrel 14 is securely held in position before and after inversion without deviations in its rotational direction while the lens carriage 15 is in movement.

Figure 3:
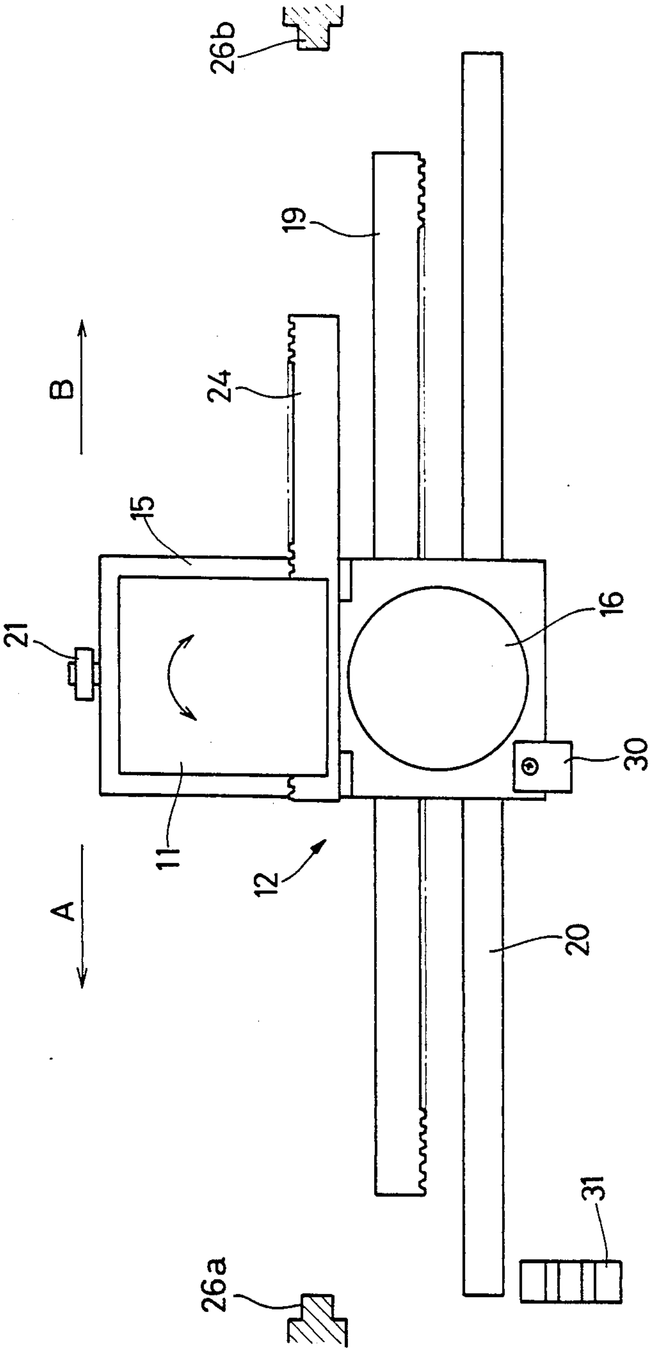
FIG. 3 is a side elevational view of the optical system inverting drive mechanism of the present invention.
Figure 4:
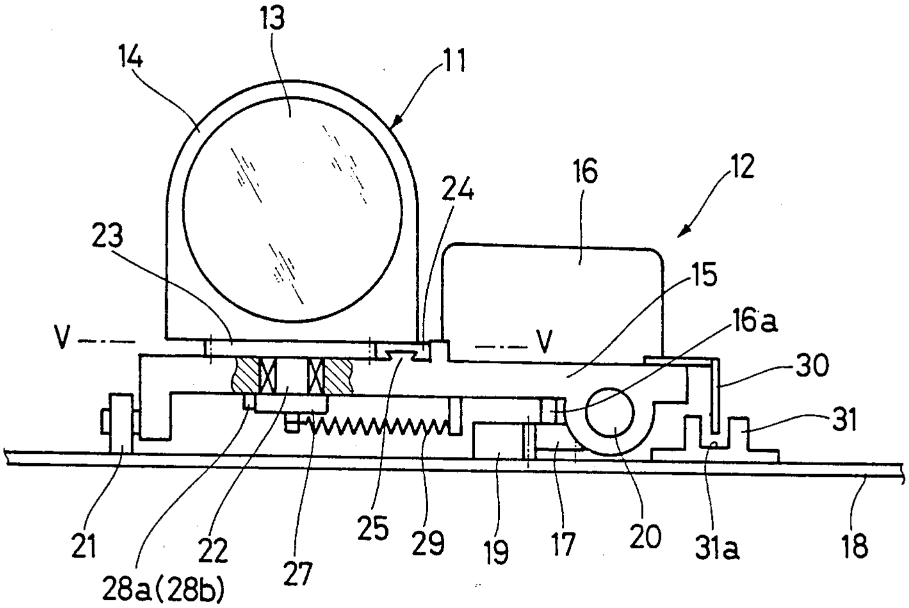
FIG. 4 is a front view of the inverting drive mechanism of the present invention.
Figure 5:
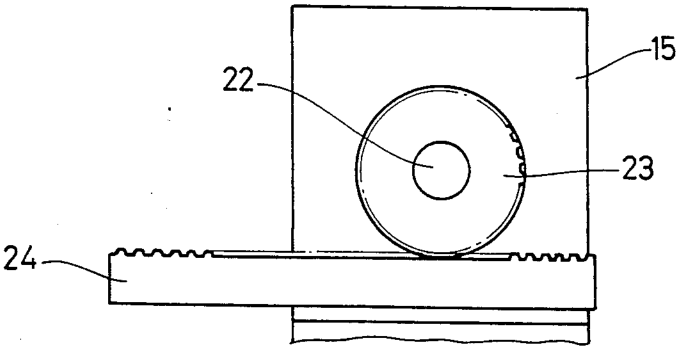
FIG. 5 is a sectional view taken on line V—V of FIG. 4.
Figure 6:
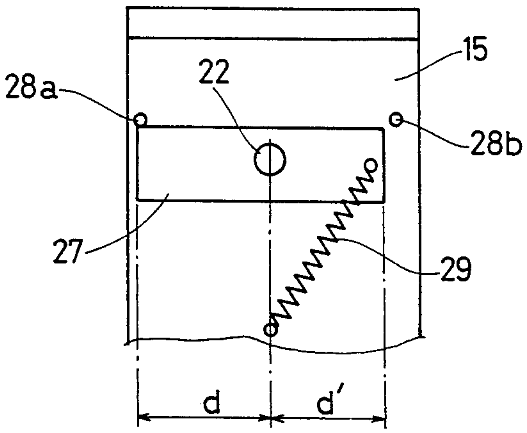
FIGS. 6(*a*) and 6(*b*) are diagrammatic illustrations of a positioning xechanism of the present invention for the lens barrel in different operational conditions.
Figure 6:
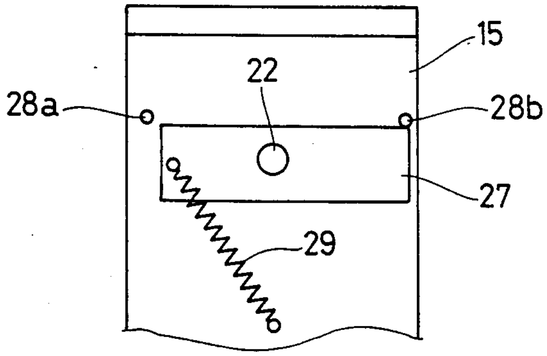

In FIGS. 3 and 4, the reference numeral 30 indicates an index plate which is mounted on the lens carriage 15 so that the position of the lens carriage 15 can be detected as it passes across a slit 31*a* of a position sensor 31 which is mounted in a predetermined position on the frame 18.

In addition to unit magnification, copy reductions and enlargements become possible by the use of a copying machine with the optical device of the above-described construction. Hereafter, for simplicity of explanation, the operation of the optical device according to the invention is described by way of an example where it is adapted for copying operations in the unit magnification, a enlarging ratio of 2 and reducing ratios of 0.714 and ½. However, it is to be understood that the ratios of copy magnification can be set arbitrarily depending upon the specifications of the machine.

For unit magnification, the optical system 11 is set in the telephoto mode position with its principal point faced toward the mirror 7 in the light path 4. Namely, the optical system 11 is located in the position P which is shifted toward the sensitive material surface 2 in the light path 4, having the principal point substantially at a midway position H in the light path 4. If a copying operation is started in this state, the light source 3 and scan mirrors 5 to 7 are moved to scan the original mount 1, and the reflected light from the original during this scanning is successively passed on through the mirrors 5 to 7, the optical system 11 and the mirrors 8 to 10 to expose the sensitive material surface 2 in the unit magnification.

For duplication in a magnification ratio of 2, the lens carriage 15 is moved in the direction of arrow A in FIG. 3 along the carriage moving rack 19 to shift the optical system 11 toward the mirror 7 from the above-described unit position to assume the position P1. Simultaneously, the positions of the mirrors 8 and 9 are shifted in a direction away from the optical system 11 to correct the conjugate length into a value suitable for ×2 magnification. Further, the optical system 11 is shifted into the position H1 which is distant from the sensitive material surface 2 by double the distance between the principal point and the original mount 1. In this state, duplication in a magnification ratio of 2 is effected, shedding light from the light source 3 on the original mount 1 and exposing the sensitive material surface 2 to reflected light from the document on the original mount 1. In this case, the light source 3 and mirrors 5 to 7 are moved by half the length of the original mount 1.

For duplications in reduction ratios 0.714 and ½, the lens carriage 15 is moved in the opposite direction, namely, in the direction of arrow B in FIG. 3, shifting the position of the optical system 11 toward the mirror 8. In this case, the lens carriage 15 is once moved to the stroke end to come the lens turning rack 24 into contact with the stopper 26*b*, thereby inverting the lens turning rack 24 and lens barrel 14 to set the optical system 11 in the retrofocus position with its principal point faced toward the sensitive material surface 2. If the optical system 11 at the aforementioned stroke end position is returned to the position P2′ as indicated by two-dot chain line in FIG. 1, duplication in a reduction ratio of 0.714 becomes feasible. Duplication in a reduction ratio of ½ is possible at the position P3. Needless to say, when the optical system 11 is shifted to the reducing positions, the positions of the mirrors 8 and 9 are also shifted for correction of the conjugate length. In a copying operation in a reduction ratio of 0.714, the optical system may be located in the position P2 of FIG. 1, if desired, without inverting its principal point.

In the above-described unit and magnifying duplications, it is necessary to position the optical system 11 in such a manner as to prevent the mirror 7 from hitting against the optical system 11 during the scanning operation. It follows that the position of the optical system 11 is shiftable in a restricted range. However, in a case where the principal point is located externally of the optical system 11 as in the present invention, the copy ratio is determined not by the position of the optical system 11 but by the position of the principal point in the light path 4. Accordingly, in the unit or enlarging copy ratios, it becomes possible to shift the position of the principal point toward the mirror 7 by a distance corresponding to A1 (a distance from the center position on the optical axis of the optical system 11 to the principal point H1 of the optical system 11) as shown in FIG. 1, in contrast to a symmetrical lens construction having the principal point internally thereof Consequently, with a light path of a give length, the range of copy ratios can be broadened in a degree corresponding to the distance A1.

Therefore, as described hereinbefore, if the optical system 11 were shifted to a reducing position with the principal point located on the side of the mirror 7, the barrel of the optical system 11 would hit against the mirror 8 at a position relatively close to the position of the principal point in unit copy ratio, namely, at a position for a small reduction ratio. However, since the optical system 11 is inverted before a shift to a reducing position from the position of unit copy ratio, its principal point is switched to the side of the sensitive material surface 2. As a result, it becomes possible to shift the position of the principal point toward the sensitive material surface 2 by a distance corresponding to the distance A2 between the optical system 11 and the principal point (the distance between the center point on the lens axis of the optical system 11 and the principal point H3), permitting to broaden the magnification range of reduction side in a degree corresponding to the distance A2 between the optical system 11 and the mirror 8.

As mentioned hereinbefore, the range of copy enlargements and reductions can be broadened to an extent corresponding to A1+A2 as compared with conventional counterparts with the same light path length. In other words, as compared with the conventional devices with the same copy magnification and reduction range, the distances to the mirrors located anterior and posterior to the optical system 11 can be shortened in a degree corresponding to A1+A2, i.e. the difference in principal point position, permitting to make copying machines smaller and more compact in size and shape. Further, reducing in the light path length means shortening in the focal length of the optical system, and this permits to reduce the sizes of copying machines further.

Figure 7:
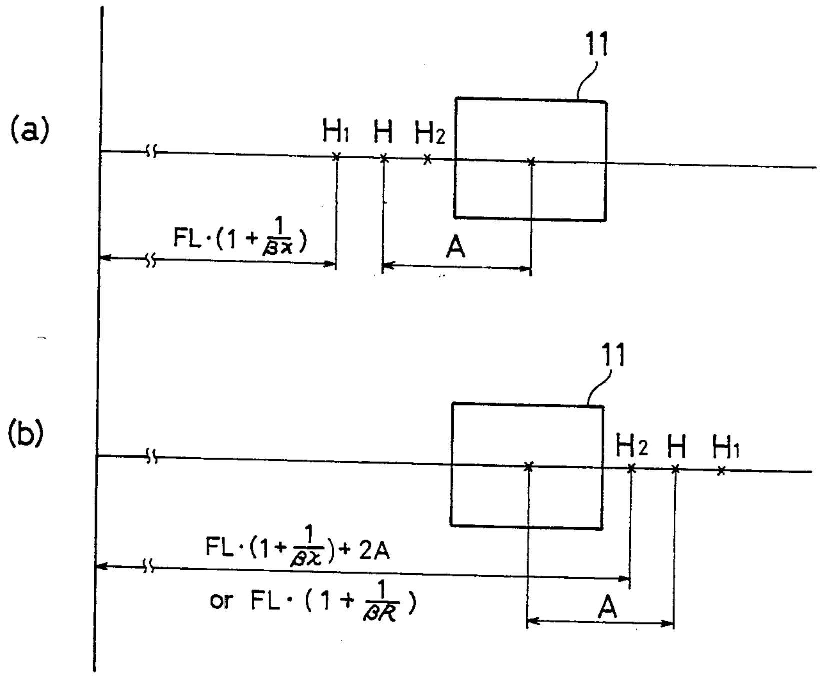
FIG. 7 is a diagrammatic illustration explanatory of the operation by the optical device of the present invention.

The inversion of the optical system 11 by the aforementioned drive mechanism 12 has to be effected in the unit copy ratio or smaller copy ratios and at a position where the lens barrel of the optical system 11 is free from interference with the mirror 8. The copy ratios available by inversion of the optical system 11 are shown in FIG. 7. In the telephoto mode, the copy magnification ratio is $\beta X$ as shown at (a) of the same figure, while in the retrofocus mode with the inverted optical system, the copy magnification ratio becomes $\beta R$ as shown at (b). Assuming that the distance from the lens center of the optical system to the principal point H (strictly the median point between the fore and rear principal points h1 and h2) is A, and the focal length is FL, the distance from the original mount to the fore principal point H1 in the telephoto mode is $FL(1+1/\beta X)$, and, when switched to the retrofocus mode from the aforementioned telephoto, the distance $FL(1+1/\beta R)$ between the original mount and the rear principal point H2 corresponds to $FL(1+1/\beta X)+2A$. Accordingly, $$FL(1+1/\beta X)+2A=FL(1+1/\beta R)$$

and the copy ratio through the optical system in the inverted position is expressed as $\beta R=1/(1/\beta X+2A/FL)$. Thus, the optimum copy ratio can be determined on the basis of the foregoing equation. In this particular embodiment, if A=40 mm, FL=200 mm and $\beta X=1$ in the position of FIG. 1, it is preferred to invert the optical system at a copy ratio $\beta R$ in the position P2′ of FIG. 1 of 0.714.

What is claimed is:

1. An optical device for copying machines with copy enlarging and reducing, comprising in combination:
   - a movable light source for illuminating a document on an original mount;
   - a plural number of mirrors for leading reflected light from said document to a predetermined light path, part of said mirrors being movable along said light path;
   - an optical system having an asymmetrical lens construction located in a midway position along said light path;

a sensitive material surface for forming an image of said document thereon for exposure through said optical system; and an inverting drive means for switching said optical system from a position where said optical system has a principal point on the side of said original mount at a time of at least maximum copy enlarging to a position where said optical system has said principal point on the side of said sensitive material at a time of at least minimum copy reducing.

2. The optical device as defined in claim 1, wherein said optical system is reversely turned by 180° when the optical system is moved from a position of unit copy ratio to a reducing position.

3. The optical device as defined in claim 1, wherein said optical system is a lens construction of fixed focal length.

4. The optical device as defined in claim 3, wherein a pair of mirrors opposed to said optical system are movable along said light path.

5. The optical device as defined in claim 1, wherein said optical system is a zoom lens construction.

* * * * *